UNITED STATES PATENT OFFICE.

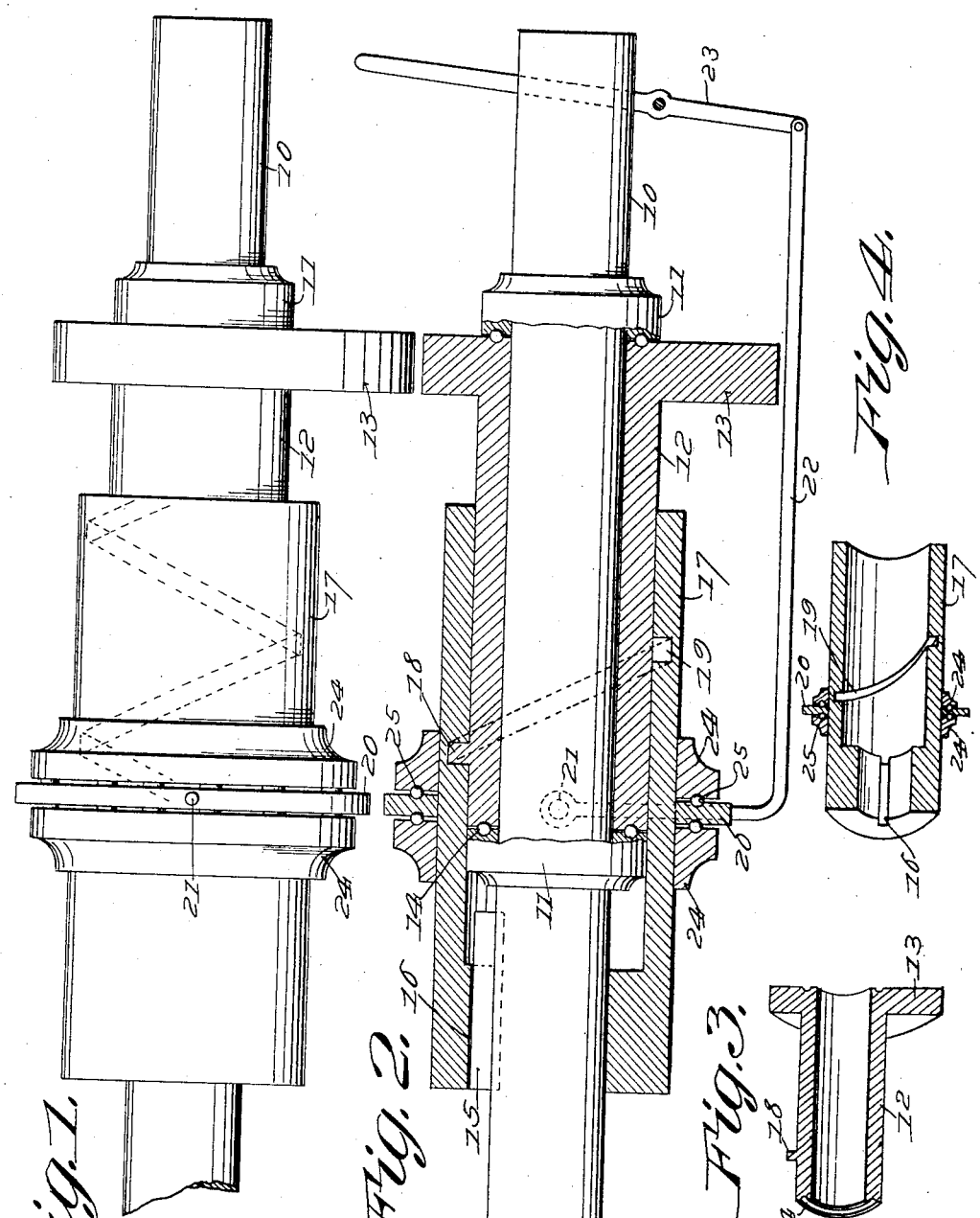

LEE HOUK KEY, OF PETROS, TENNESSEE, ASSIGNOR OF ONE-HALF TO A. K. SHELTON, OF PETROS, TENNESSEE.

REVERSE-GEAR.

1,331,267.  Specification of Letters Patent.  Patented Feb. 17, 1920.

Application filed June 11, 1918. Serial No. 239,440.

*To all whom it may concern:*

Be it known that I, LEE HOUK KEY, a citizen of the United States of America, residing at Petros, in the county of Morgan and State of Tennessee, have invented new and useful Improvements in Reverse-Gears, of which specification was filed June 11th, 1918, and bears Serial Number 239,440.

The object of the invention is to provide a reversing gear for use in connection with engines of various types which may be operated with ease and convenience under heavy pressure of steam and other adverse conditions, to avoid the disadvantages encountered in the ordinary practice wherein, in some instances, it is practically impossible to effect a reversal without a reduction of speed, or without the application of more power than can usually be exerted by the operator, due largely to the frictional resistance offered to the movement of the parts necessary to effect such reversal.

With these and other objects in view, the invention consists in the construction, combination and relation of parts hereinafter fully described, it being understood, however that changes in form, proportion and detail may be resorted to, within the scope of the appended claim without departing from the spirit of the invention.

In the drawing;—

Figure 1 is a side view of a valve reverse gear constructed in accordance with the invention.

Fig. 2 is a similar view showing both the sleeve and the cam carrying thimble in section.

Figs. 3 and 4 are sectional perspective views respectively of the sleeve and thimble.

In connection with the shaft 10 and mounted thereon between the collars 11, which are secured to the shaft, is a thimble 12 carrying the valve shifting cam 13 and having ball bearing contacts as at 14 with said shaft collars, so as to reduce to the minimum frictional resistance at this point.

Inclosing the thimble and having a sliding connection with the shaft by means of a key 15 and key-way 16 is a sleeve 17 which turns with the shaft while being capable of an axial or longitudinal movement relative to the thimble 12, and a screw connection is provided between the sleeve and the thimble as by providing one of them, for example the thimble, with a pin or stud 18, and the other with a spiral groove 19 in which the pin or stud operates. A longitudinal or axial movement of the sleeve relative to the shaft and thimble will thus through the coöperative relation of the members of the threaded connection, consisting of said stud and groove, cause a revoluble movement of the thimble and a corresponding adjustment of the cam. The movement of the sleeve is secured by means of a yoke 20 with the pintles 21 of which are engaged links 22 leading to a reversing lever 23, the yoke being connected with the sleeve, for affording axial movement to the other, by being mounted between collars 24 with interposed anti-friction or ball bearings 25.

Obviously the inclination of the thread forming a connection between the sleeve and the thimble may be at a sufficiently acute angle to insure movement of the thimble with a relatively slight application of power to the sleeve, and the anti-friction bearing relations between the yoke and the sleeve and between the thimble and the shaft collars in other respects minimizes resistance so that an adjustment or reversal of the valve mechanism may be accomplished with very slight leverage and hence a minimum of effort on the part of the operator regardless of the resistance which may be offered by the steam or other pressure.

What is claimed is:—

In a reversing gear mechanism, the combination with a shaft provided with a pair of spaced collars, of a cam thimble mounted thereon between the collars so as to be precluded from longitudinal movement, the thimble having revoluble movement on the shaft, a sleeve in surrounding relation to the thimble and projecting beyond one collar, the sleeve having a keyed connection with the shaft whereby it is precluded from angular movement with respect thereto but permits longitudinal movement thereon, the inner wall of the sleeve where it surrounds the thimble being formed with a spiral groove, the thimble carrying a radially disposed pin engaging in said groove, and means for imparting longitudinal movement to the sleeve when the shaft is in motion whereby angular movement of the sleeve with respect to the shaft is effected.

In testimony whereof I affix my signature.

LEE HOUK KEY.